US011496674B2

(12) United States Patent
Deng et al.

(10) Patent No.: US 11,496,674 B2
(45) Date of Patent: Nov. 8, 2022

(54) CAMERA PLACEMENT GUIDANCE

(71) Applicant: Microsoft Technology Licensing, LLC, Redmond, WA (US)

(72) Inventors: Hongli Deng, Bellevue, WA (US); Ryan Savio Menezes, Bellevue, WA (US); Shuaib Rasool, Bothell, WA (US); Ali Reza Emami, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/025,974

(22) Filed: Sep. 18, 2020

(65) Prior Publication Data
US 2022/0094844 A1  Mar. 24, 2022

(51) Int. Cl.
H04N 5/228 (2006.01)
H04N 5/232 (2006.01)
G06T 7/70 (2017.01)
G06V 20/20 (2022.01)
H04N 5/272 (2006.01)

(52) U.S. Cl.
CPC .......... *H04N 5/23222* (2013.01); *G06T 7/70* (2017.01); *G06V 20/20* (2022.01); *H04N 5/232935* (2018.08); *H04N 5/272* (2013.01); *G06T 2207/30244* (2013.01)

(58) Field of Classification Search
CPC ......... H04N 5/23222; H04N 5/232935; H04N 5/272; G06T 7/70; G06T 2207/30244; G06K 9/00671

USPC ....................................................... 348/222.1
See application file for complete search history.

(56) References Cited

U.S. PATENT DOCUMENTS

| 8,564,661 | B2 | 10/2013 | Lipton et al. |
| 9,386,302 | B2 | 7/2016 | Zeng et al. |
| 9,439,556 | B2 | 9/2016 | Pandya et al. |
| 9,667,860 | B2 | 5/2017 | Hakim et al. |
| 10,110,856 | B2 | 10/2018 | Rasheed et al. |
| 2003/0058342 | A1 | 3/2003 | Trajkovic |

(Continued)

FOREIGN PATENT DOCUMENTS

| EP | 2966851 A1 | 1/2016 |
| JP | 3891181 B2 | 12/2006 |

(Continued)

OTHER PUBLICATIONS

Stephens, Don, "Heat Map: Visualizing Motion Detected by a Security Camera", Retrieved from: https://www.cctvcameraworld.com/heat-map-visualization-security-camera/, Oct. 4, 2018, 4 Pages.

(Continued)

*Primary Examiner* — Usman A Khan
(74) *Attorney, Agent, or Firm* — Rainier Patents, P.S.

(57) ABSTRACT

The description relates to cameras, such as security cameras, and providing guidance for positioning cameras to achieve desired goals. One example can receive an image of a scene overlaid with transparent indicators that reflect accuracy of object detection in individual regions of the image. The example can correlate input received from the user on the display relative to the regions. The example can analyze subsequent images of the scene with rules derived from the input from the user.

22 Claims, 16 Drawing Sheets

(56) References Cited

U.S. PATENT DOCUMENTS

| | | | |
|---|---|---|---|
| 2004/0189829 A1* | 9/2004 | Fukuda | H04N 5/23222 348/239 |
| 2010/0110183 A1 | 5/2010 | Bobbitt et al. | |
| 2010/0123737 A1* | 5/2010 | Williamson | G06T 15/20 345/672 |
| 2011/0141141 A1* | 6/2011 | Kankainen | G06T 3/4038 345/632 |
| 2013/0038759 A1* | 2/2013 | Jo | H04N 5/232945 348/240.99 |
| 2013/0202154 A1* | 8/2013 | Hirano | H04N 13/221 382/103 |
| 2013/0258117 A1* | 10/2013 | Penov | G06K 9/2081 348/207.1 |
| 2014/0321754 A1* | 10/2014 | Ruan | G06V 10/25 382/195 |
| 2014/0347475 A1 | 11/2014 | Divakaran et al. | |
| 2015/0124125 A1* | 5/2015 | Kim | H04N 5/232933 348/239 |
| 2017/0148186 A1* | 5/2017 | Holzer | G06F 16/5838 |
| 2017/0193307 A1 | 7/2017 | Stelzer et al. | |
| 2018/0342100 A1* | 11/2018 | Mollis | G06T 15/205 |

FOREIGN PATENT DOCUMENTS

| | | |
|---|---|---|
| WO | 03030550 A1 | 4/2003 |
| WO | 2019186889 A1 | 10/2019 |

OTHER PUBLICATIONS

"International Search Report and Written Opinion Issued in PCT Application No. PCT/US21/035566", dated Sep. 16, 2021, 12 Pages.

* cited by examiner

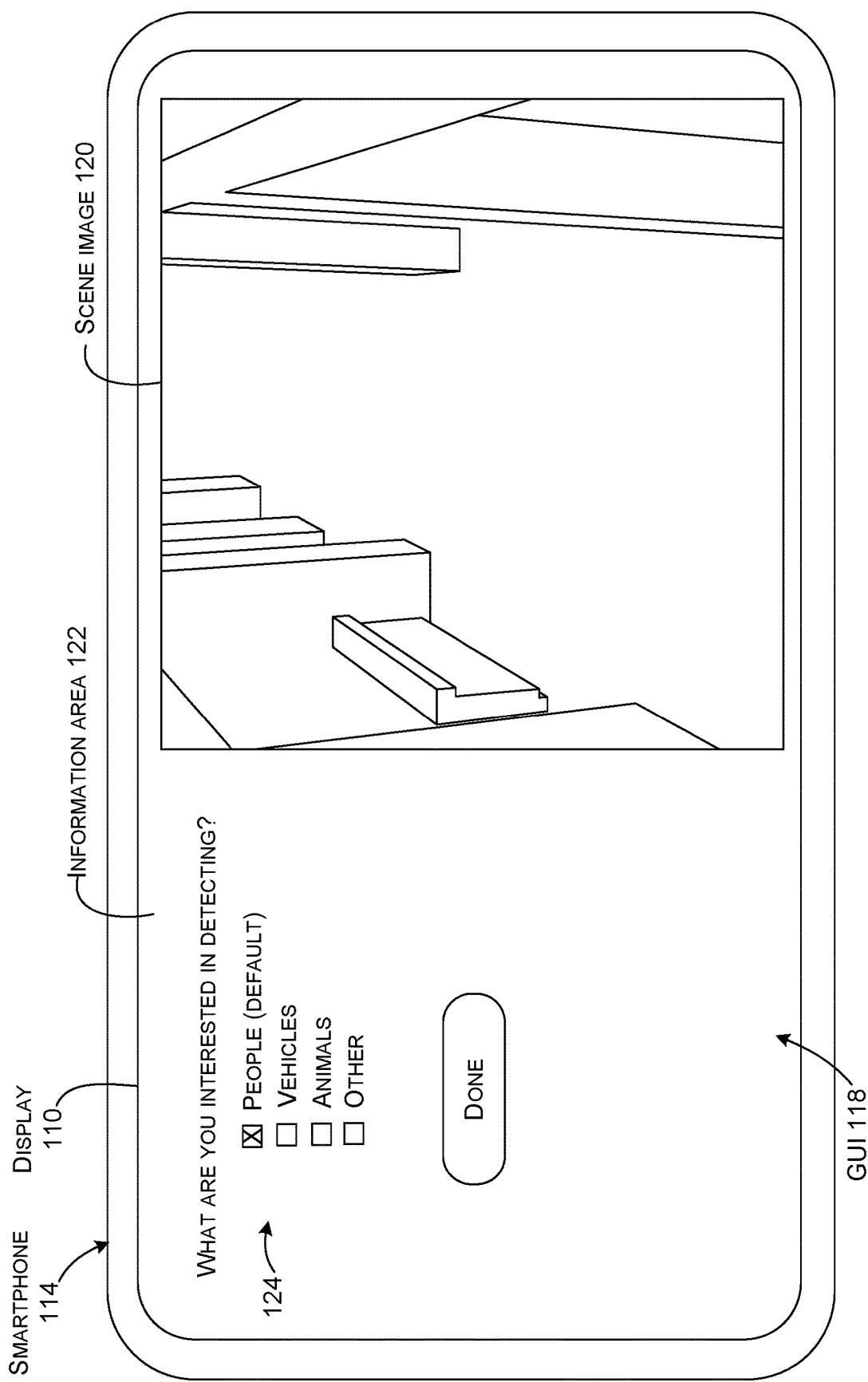

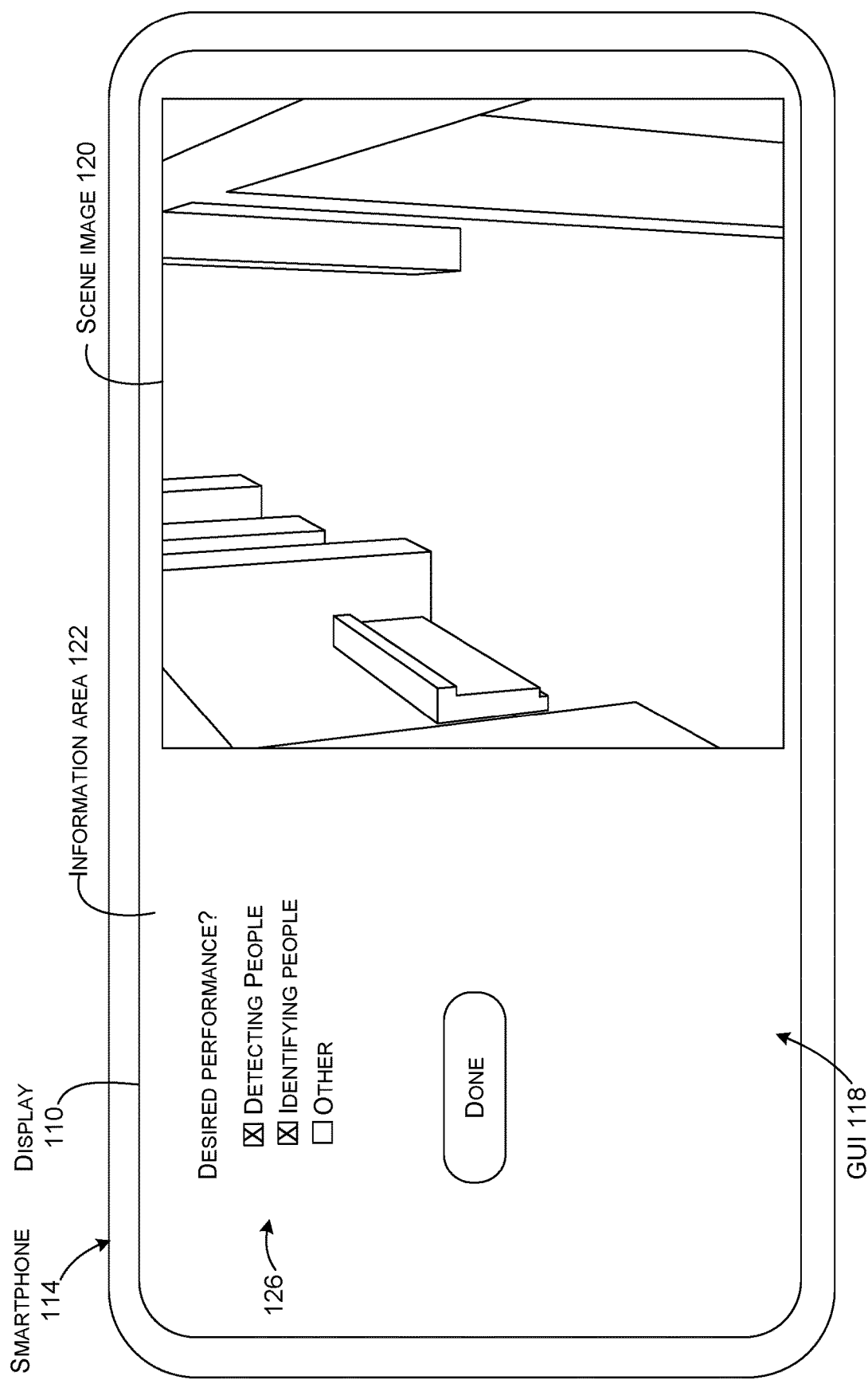

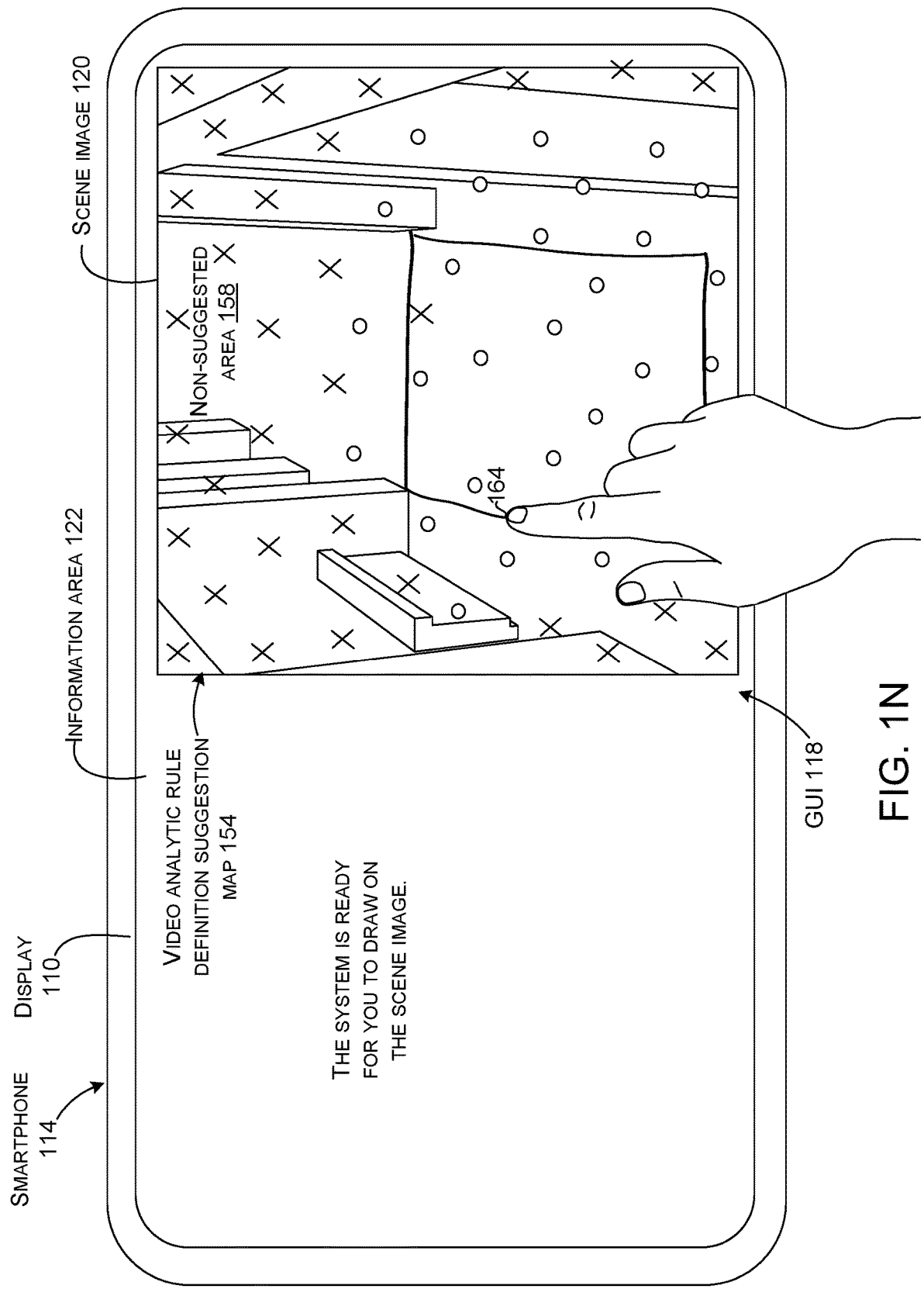

CAMERA PLACEMENT GUIDANCE

BACKGROUND

The discussion relates to assisting in camera deployment. Traditionally, if a party wants to have surveillance of an area, such as an exterior of a building, a roadway, or an interior of a building, a user, such as a technician installs a camera relative to the area. Subsequently, the technician or some other person in a control room looks at the images from the camera and tries to determine if the position and/or orientation of the camera are adequate. If not, the technician goes back to the camera and tries to make adjustments to improve the images. This process may be repeated for multiple iterations that may or may not provide the desired results. The present concepts address these and other issues.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

This discussion relates to cameras and imaging scenarios. Often cameras are employed in a particular scene for a desired purpose, such as to determine how many people use a room in a facility over a period of time, such as a day. Determining how many people use a room can be achieved with analytics run on images from the camera. If the camera is not positioned properly, the accuracy of the analytics is compromised.

Commonly, in a commercial setting a technician will use a ladder to mount the camera pointed at the scene with no more than an educated guess as to whether the camera is going to achieve its purpose. Subsequently, the technician and/or others will review footage from the camera at a remote location, such as a control room. If the results seem unsatisfactory, the technician may return to the room, go back up the ladder to the camera, and attempt to make best guess adjustments.

Similarly, in a home environment, a user may install the camera relative to a desired area, such as a walkway approaching a door to the house. The user may then go view output from the camera on their computer in an attempt to determine if the camera is positioned properly. If the user decides the camera is not positioned properly, the user may go back and fiddle with the camera position.

The present concepts can offer a much more satisfying and efficient process. The user can physically position the camera relative to the scene. The physical position can include height, angle, and/or distance from the scene (e.g., camera pose). The present concepts can analyze images from the camera and provide performance evaluations to the user in real-time (e.g., while the user is still on the ladder). If the performance evaluation indicates the camera performance is unsatisfactory, the user can be provided with suggestions for improving performance. For instance, the suggestions may indicate that the user should tilt the camera up or down, move the camera to a higher or lower location, and/or move the camera closer to or farther from the scene, among other suggestions.

The user can be satisfied with the performance or implement the suggestion. Either way, the user can climb down the ladder confident in the performance of the camera and analytics that utilize images from the camera and with peace of mind that he/she will not have to return and climb the ladder again. These and other aspects are described in more detail below.

Figure 1A:
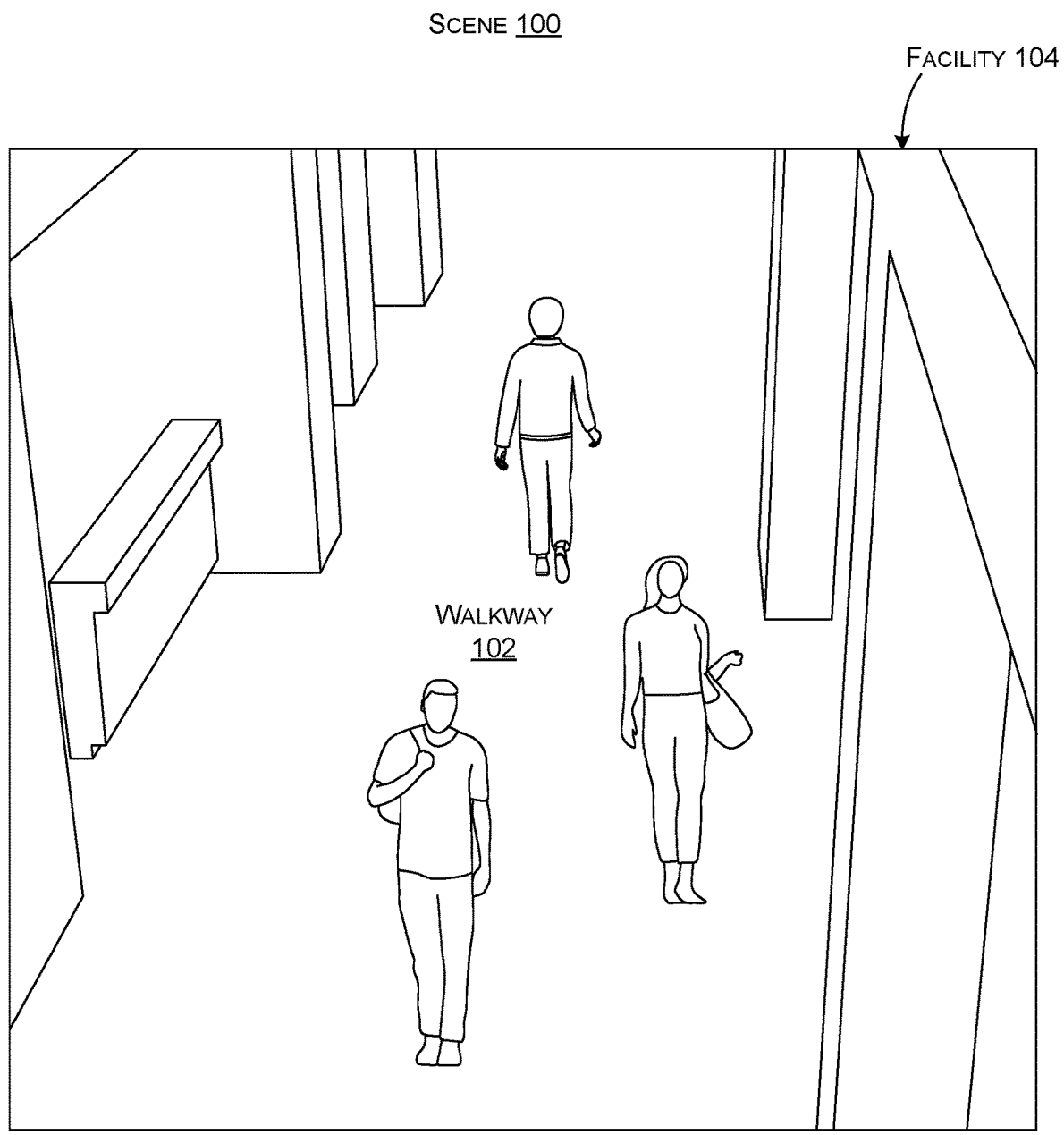
FIGS. 1A-1N show perspective views relating to an example scene to which some of the present camera guidance concepts can be applied.

FIGS. 1A-1N collectively relate to an example scene 100 and collectively show aspects of the present concepts. (Note that the limitations of line drawings impose some simplification of the illustrated aspects).

FIG. 1A shows scene 100, which in this case is a controlled-access walkway 102 in a facility 104. For purposes of explanation, assume that facility security personnel want to know if anyone is in the walkway 102, how long people are in the walkway, how many people per unit time use the walkway, etc. Alternatively or additionally, in some cases the security personnel may want to identify anyone in the walkway 102 to ensure they are authorized to be there. Toward this end, the security personnel decide to install a camera to monitor the walkway 102.

Figure 1B:
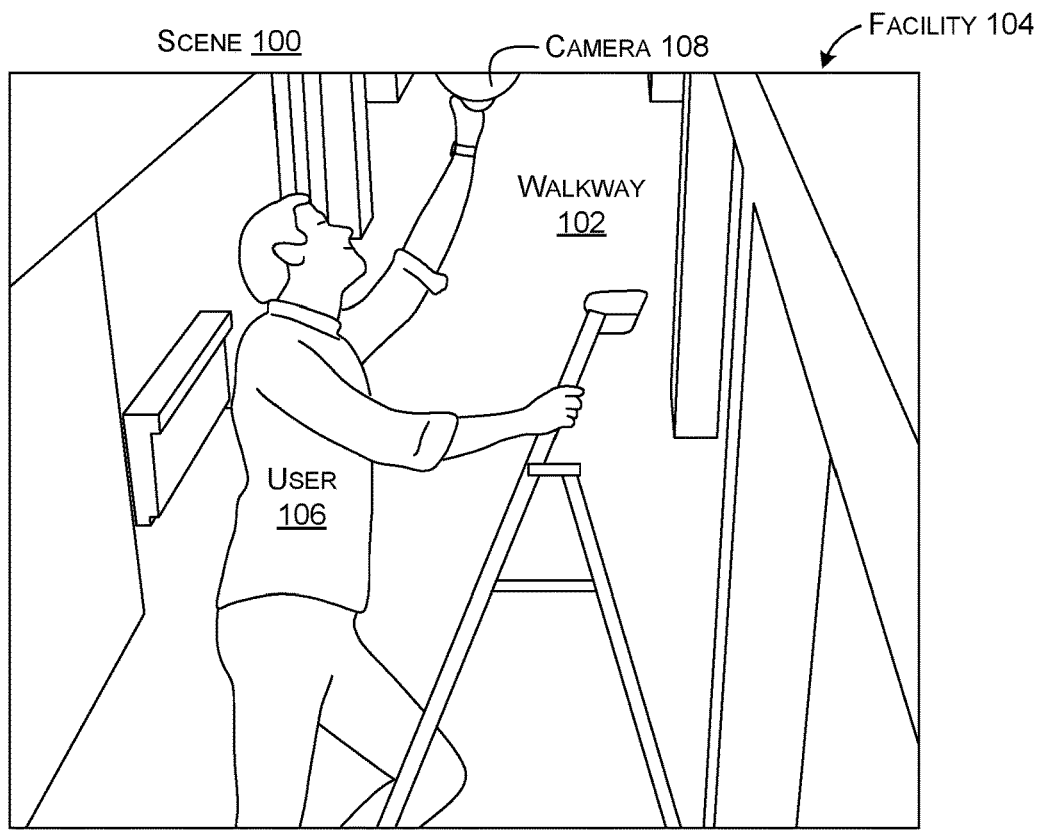

FIG. 1B shows a user (such as a technician) 106 installing a camera 108 relative to the scene 100. In some implementations, the camera 108 is a fixed surveillance camera, but other camera types can be employed. For instance, any camera that can be temporarily secured in a given pose can benefit from the present concepts. In this case, the camera is positioned at a location on the ceiling and oriented at an angle toward the scene 100 (e.g., the walkway 102). Once positioned, the camera 108 may be fixed in place and angle unless manually changed by the user. Alternatively, the camera may have adjustment mechanisms that can control aspects of the camera, such as where the camera is pointing. The present concepts can allow these adjustment mechanisms to be employed more effectively than traditional configurations.

In this example, the camera can be a two-dimensional (2D) visible light camera (RGB) camera. However, the present concepts can improve the performance and user experience relating to other camera types, such as three dimensional (3D) cameras, cameras that utilize wavelengths of light that are not visible to humans, and/or any combinations of these configurations, among others.

Figure 1C:
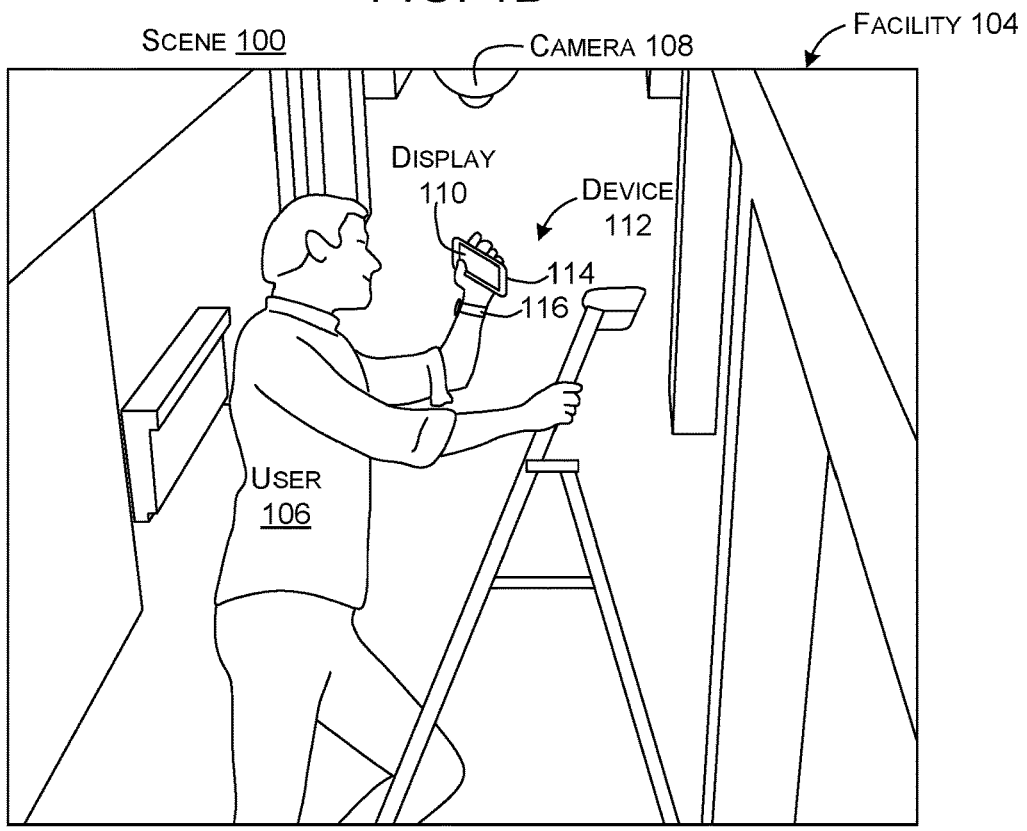

FIG. 1C shows the user 106 looking at a display 110 relating to the camera 108. The display 110 can be on any type of device 112. In this case the display 110 is on a smart phone 114 of the user, though other devices 112 could be employed. For instance, the display 110 could be on the user's smart watch 116, or on the camera 108, among other examples.

FIG. 1D shows a closeup view of display 110 on smart phone 114. In this case, the display 110 includes a graphical user interface (GUI) 118 relating to the camera. In this implementation, the GUI 118 includes a scene image 120 and an information area 122. The scene image 120 can be an image or images of the scene as captured by the camera. The scene image 120 tends to capture a subset of the scene 100 shown in FIG. 1A.

The information area 122 can relate to various parameters associated with the scene image 120. In this example, the information area queries the user about what type of objects the user is interested in at 124. For user convenience this example automatically defaults to detecting people in the scene image 120, but the user can change this parameter as desired. Note that the query about objects for detection is illustrated here for purposes of explanation. However, this aspect may be performed in advance and/or performed by another user viewing another GUI, such as in the control room. In this example, assume that the user selects "people" and "done."

FIG. 1E shows a subsequent GUI 118 generated responsive to the user input relative to FIG. 1D. In this case, the user can input the type of performance or analysis they are installing the camera for at 126. As mentioned above, in this scenario, the user is installing the camera to detect people in the walkway and determine various aspects about the people. For instance, the aspects could relate to how many people walked across the walkway, how long they were in the walkway, and/or the identity of the detected people to determine if they are authorized to be in the walkway. Thus, the user can select "detecting people" and "identifying people" and then "done."

This user input can influence how the camera position is evaluated. For instance, if the user simply wanted to know how many objects moved through the walkway, whether they be people, dogs, or lunch carts, then the camera could be positioned above the walkway pointing straight down. In such a case, analysis of scene images could still provide accurate results (e.g., an accurate object count). However, if the user wants to only count humans, analysis of scene images from such a straight-down orientation may not provide satisfactory accuracy. Similarly, if the user wants to identify people that pass through the walkway, user recognition analysis can be performed using biometrics. Examples of biometrics that can be useful for identification can include facial features, such as distance between the eyes, relative position and shape of the eyes, nose, and mouth, among others. Non-facial biometrics can include height, gate, femur length, humerus length, shoulder width, etc.

These biometrics tend to be more observable at specific camera angles and locations. For instance, if the camera is mounted too low, people in front tend to block people behind them. If the camera angle is too steep (e.g., approaching vertical) the images tend to record the tops of the peoples' heads and few of the details that are useful biometrics. Thus, from one perspective, the system analytics can be more accurate at detecting humans where the whole human body is contained in the image and the image is obtained at an acute angle that is not too steep (e.g., straight down) and not too shallow (e.g., people in front (toward the camera) occlude people in back (away from the camera)). The system can utilize this information about how the scene images will be used in the evaluation of the camera placement.

Figure 1F:
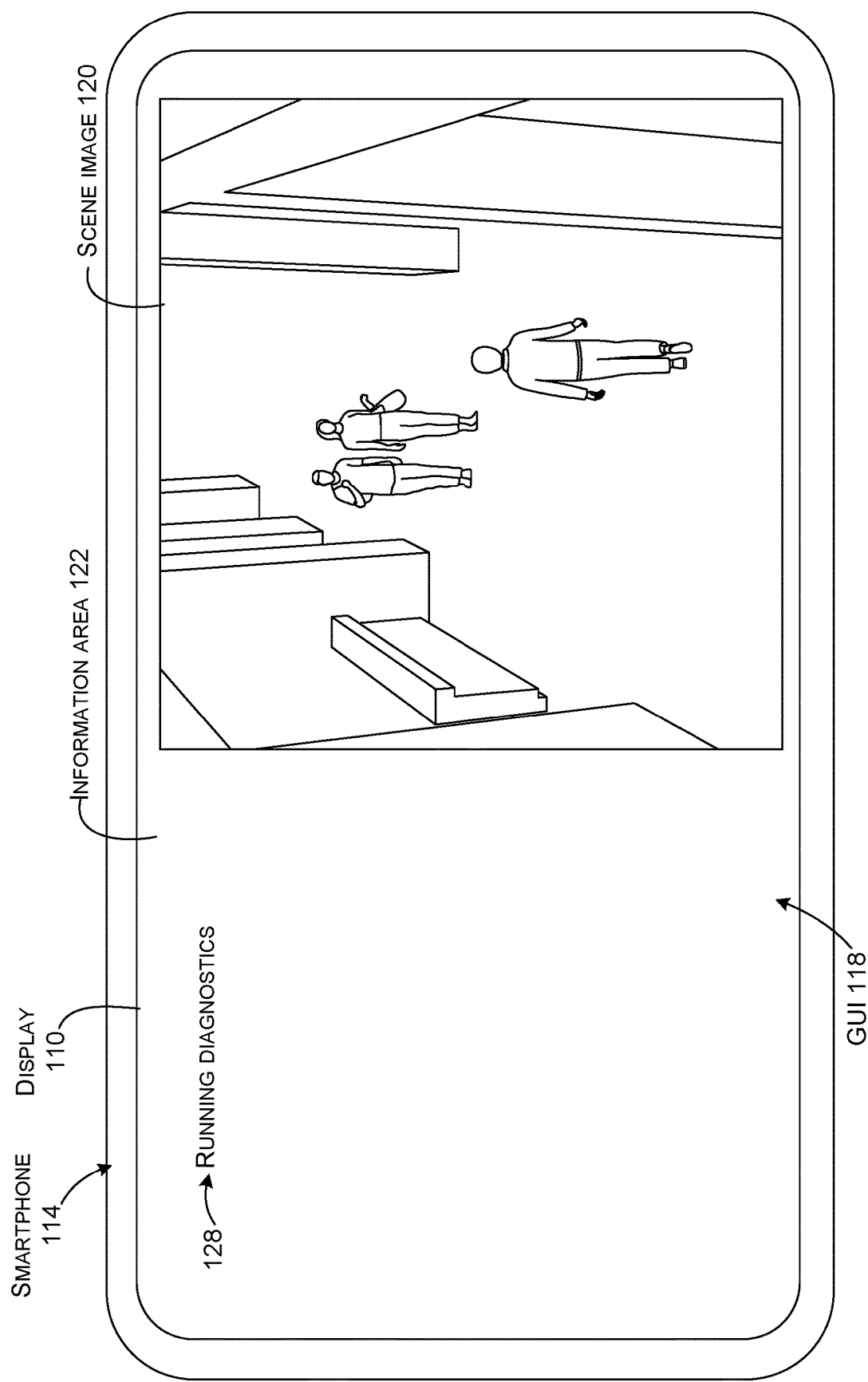
Figure 1G:
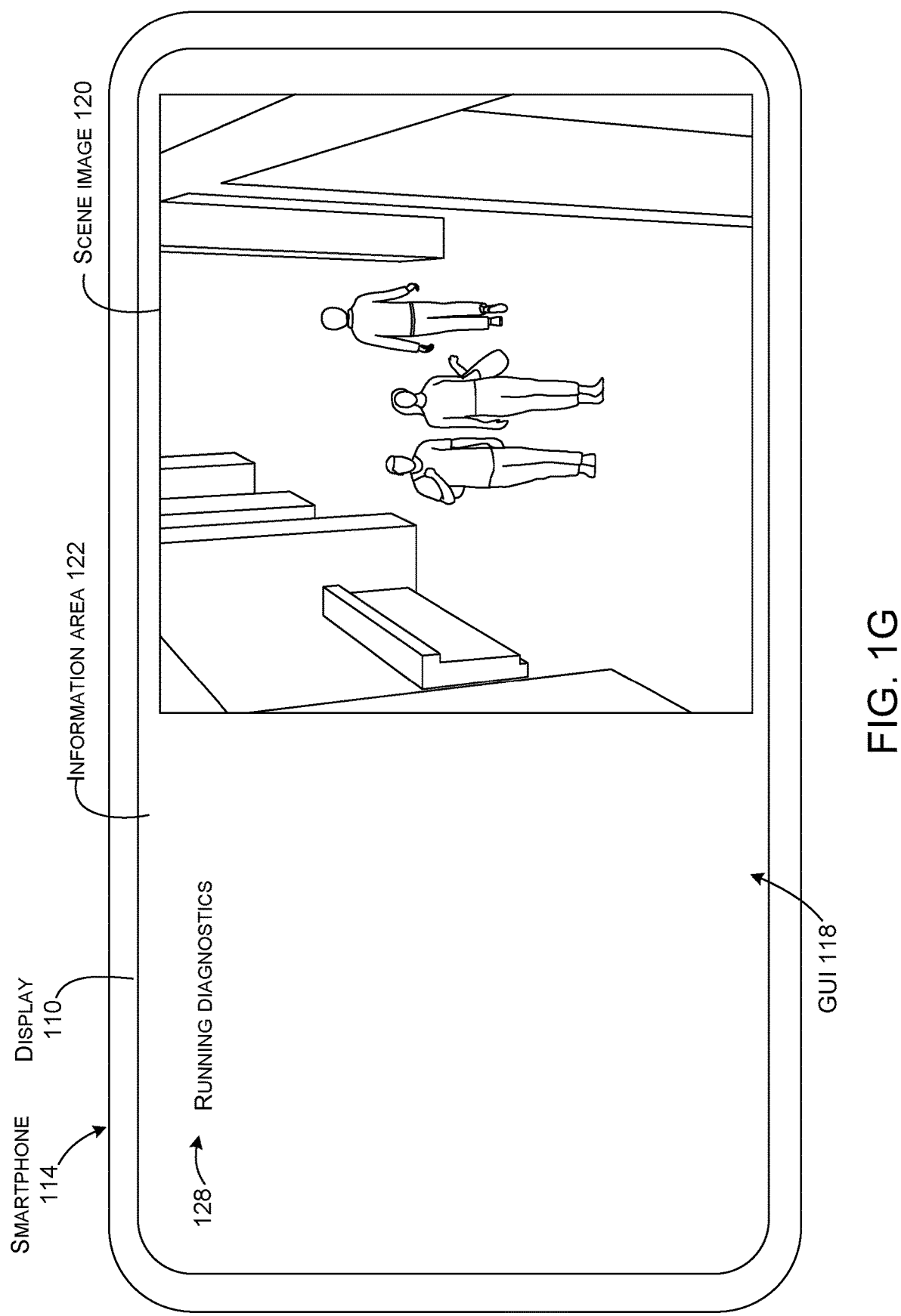

Based at least in part upon the user defined parameters (e.g., intended use), the system can run a set of images (e.g., a video stream) of the scene for a period of time, such as a few seconds to capture people walking through the scene. This aspect is shown in FIGS. 1F and 1G as indicated to the user at 128. Given the constraints of line drawings and for sake of brevity, only two scene images are illustrated for this set of images. In practice, hundreds or thousands of images, such as a one-minute duration video stream may be evaluated. The system can automatically deduce the camera pose relative to the scene based at least in part upon the video stream of people walking through the scene image 120. This aspect is shown in FIG. 1H.

Figure 1H:
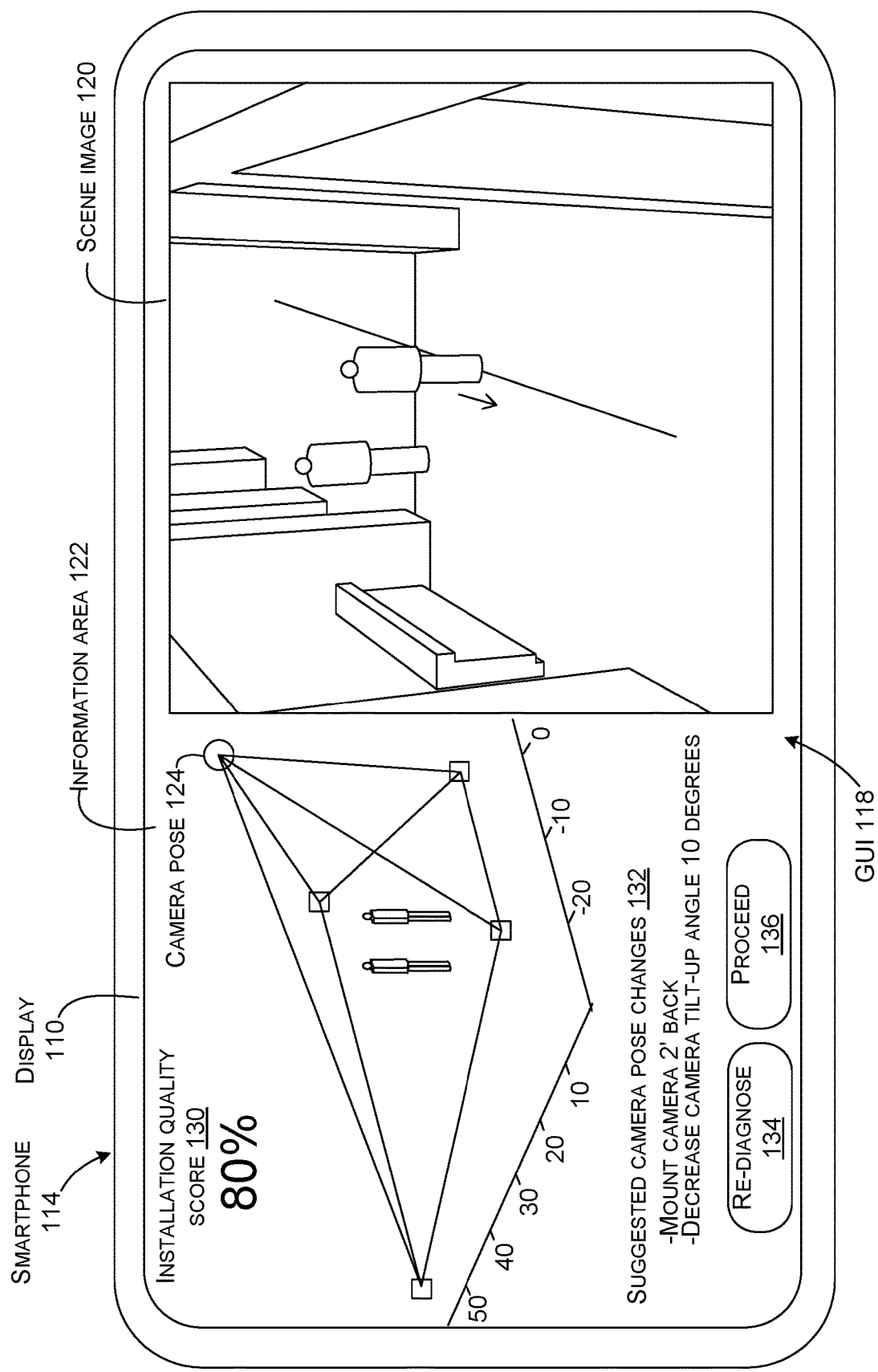

FIG. 1H shows another GUI 118. In this GUI, the information area 122 shows the camera pose or position at 124 (e.g., location and angle) relative to the scene image 120. Based at least in part on the camera pose, the system can generate an installation quality score 130. In this example, the installation quality score 130 presented in the information area 122 is "80%." This installation quality score 130 estimates how well video analytic systems will perform utilizing scene images 120 from the camera at the pose.

If the user is satisfied with the installation quality score 130 and/or the installation quality score 130 satisfies a threshold, then the physical positioning portion of the camera installation can be viewed as complete. Alternatively, the system can also determine changes to the camera pose that may help the installation quality score 130. Examples of suggested camera pose changes to improve the installation quality score are shown at 132. In this example, for purposes of explanation, the suggestions include "mount camera 2 ft farther back" and "decrease camera tilt-up angle 10 degrees." The effects of the suggestions can be calculated from the illustrated 3D geometric shape with the camera at its apex. If the user implements either or both of the suggestions, then the processes described relative to FIGS. 1E-1G can be repeated. This process can be repeated iteratively until the threshold is satisfied and/or the user is satisfied.

Figure 1I:
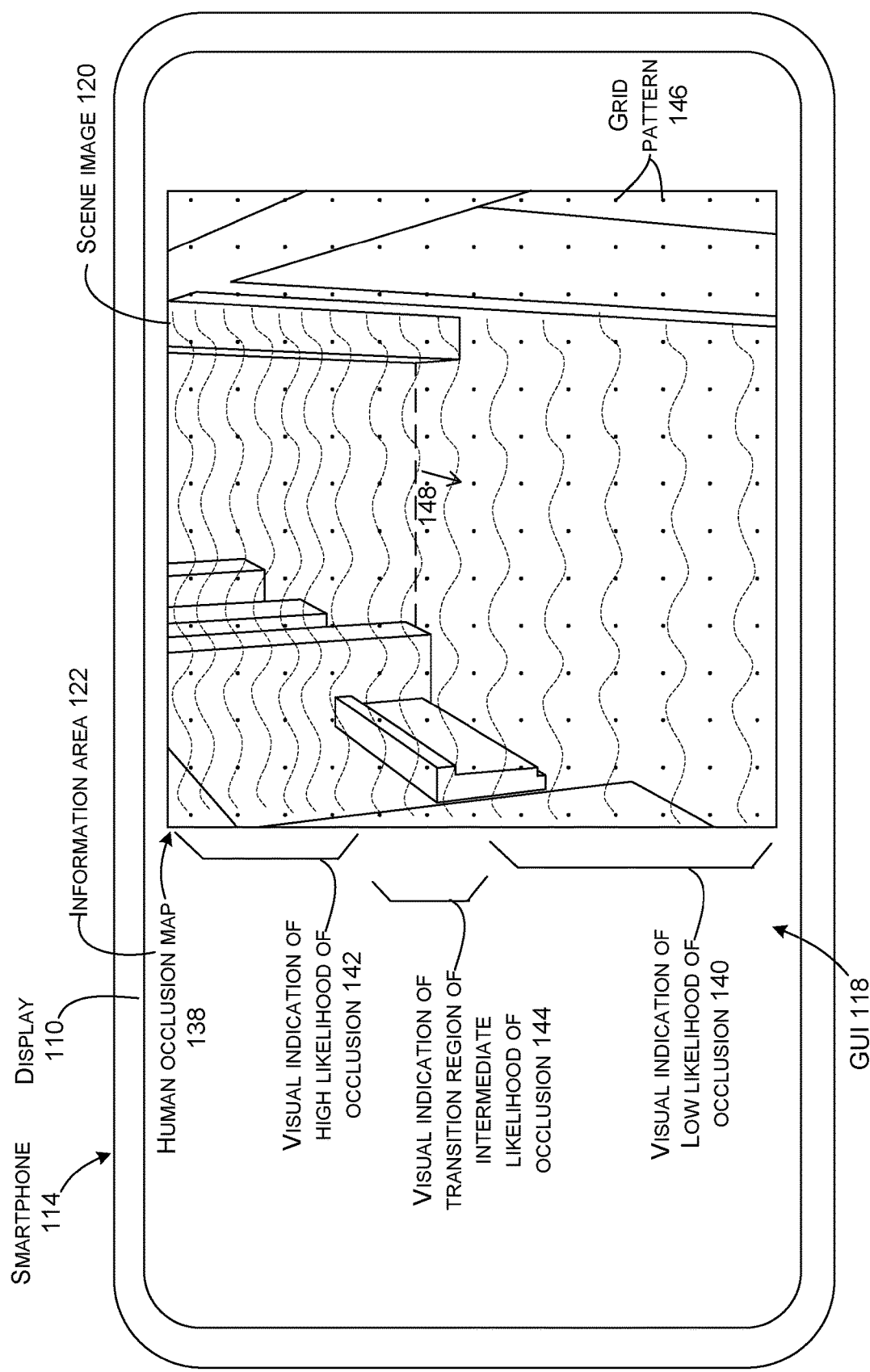
Figure 1J:
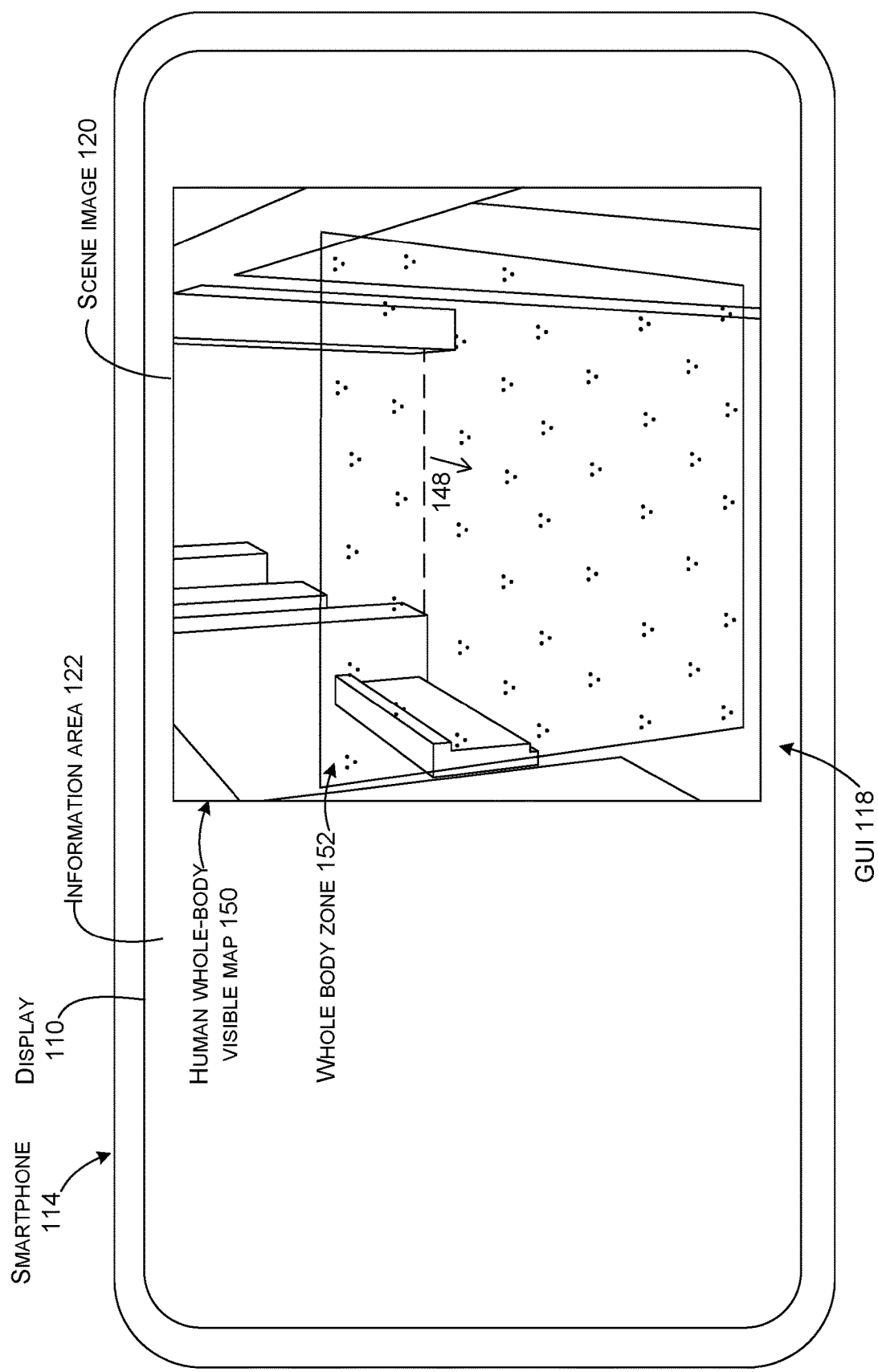
Figure 1K:
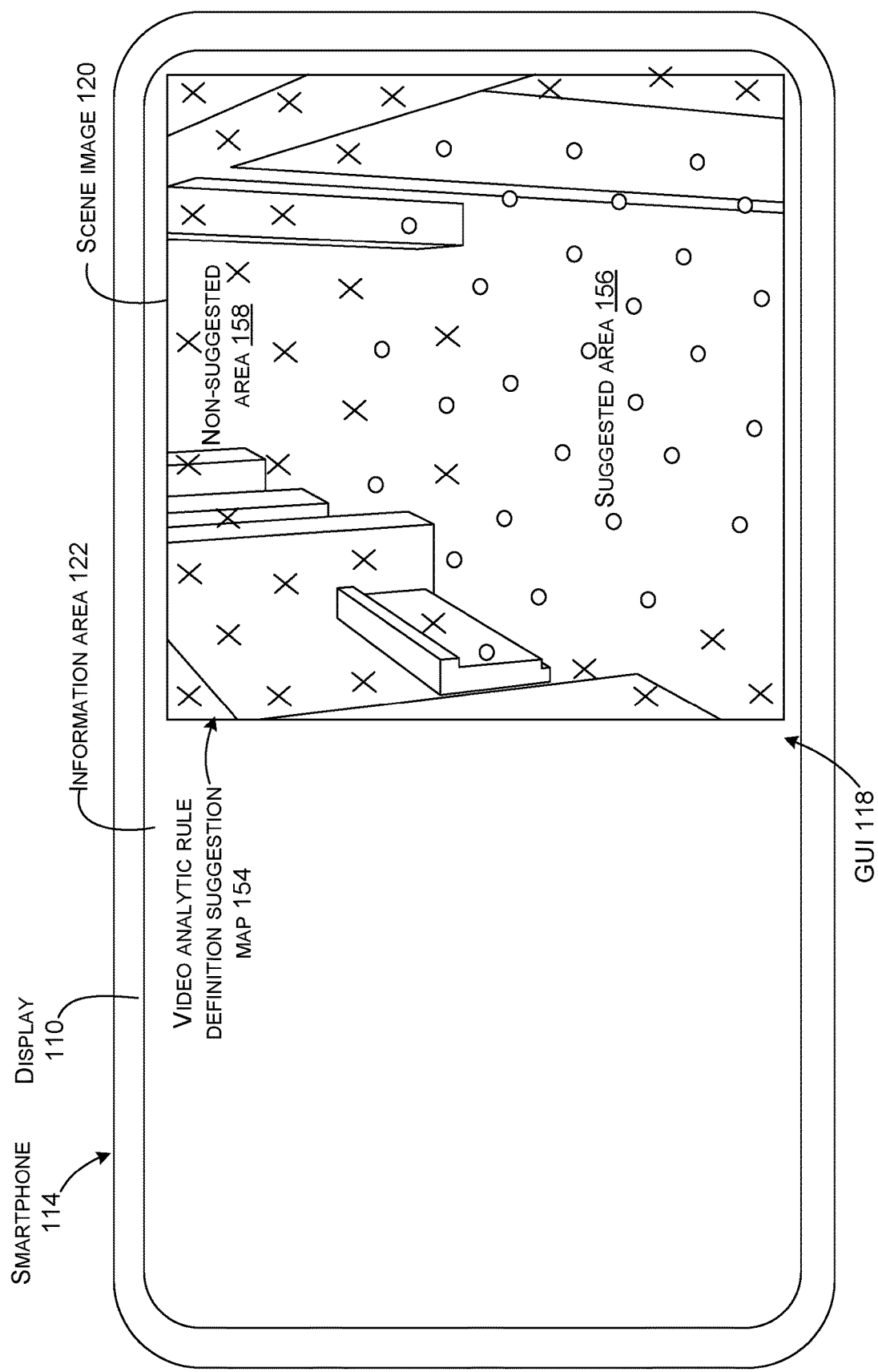

FIGS. 1I-1K can provide the user with rules definition information by conveying information about the accuracy of analytics performed on individual regions of the image. The rules definition information can aid the user in the rule definition process. Rule definition can refer to the user drawing graphic objects on the camera scene image and/or taking other actions to help deduce events of interest.

FIG. 1I shows an example human occlusion map 138 superimposed on a scene image 120. In this case, the human occlusion map 138 includes a visual indication of low likelihood of occlusion at 140, a visual indication of high likelihood of occlusion at 142, and a visual indication of intermediate likelihood of occlusion at 144 in the transition region between the high and low regions. These visual indications can provide information to help guide the user where to define rules. For instance, the user is interested in the region of the image with a low likelihood of occlusion 140, then the information indicates to the user that the user will likely be satisfied with analytics performed on this region. However, if the user is interested in the visual region of high likelihood of occlusion 142, the results may be less accurate and hence less satisfying. In this latter scenario, the user may consider repositioning the camera to get better results for this region.

In the illustrated example, the density of wavy lines provides the visual indication regarding occlusion with a higher density indicating a higher likelihood of occlusion. Other visual indicators can be employed. For instance, one implementation can utilize colors as the visual indicators. For example, diffuse green color could be used to indicate a low likelihood of occlusion and a diffuse red color could be used to indicate a high likelihood of occlusion. The intervening region could be conveyed with low amounts of the green color and low amounts of the red color and fading as they get farther from their respective areas. In this example, the greener an area is on the map, the better it can be for defining the analytics rules in the scene image.

This example also includes a grid pattern 146 on the image to help the viewer grasp the scale of the scene image 120 and/or how analytics may superimpose the grid for objection detection purposes. For instance, the grid pattern could be set at 3 feet so that a human occupies approximately one grid space. Based upon the reflected likelihood, the human occlusion map 138 also includes a suggested border line 148 for the user. The suggested border line 148 suggests that any user defined areas be on the side of the suggested border line indicated by an accompanying arrow.

FIG. 1J shows another information GUI 118 that can aid the reader in defining rules for the camera. This GUI includes a human whole-body visible map 150. The human whole-body visible map 150 shows a 3D whole body zone 152 where an entirety of human bodies passing through the zone are visible in the scene image 120. Remaining areas of the scene image will capture only portions of users.

FIG. 1K shows another information GUI 118 that can aid the reader in defining rules for the camera analytics. This GUI includes a video analytic rule definition suggestion map 154. The video analytic rule definition suggestion map includes suggested areas 156 and non-suggested areas 158. In this case, the areas are distinguished by different hashing: "O"s for the suggested areas 156; and "X"s for the non-suggested areas 158. Other visual indicators can be employed. For instance, in one case, one color could be used for the suggested areas 156 and another color for the non-suggested areas 158. The colors can be transparent so the underlying structures, such as walls and countertops are visible to the user.

The user can utilize any of the information GUIs 118 described relative to FIGS. 1I-1K to help them decide where to define rules for the camera and hence analysis performed on images from the camera. This information allows the user to make a decision based upon both what areas are important to them and what areas the camera is effectively capturing.

Figure 1L:
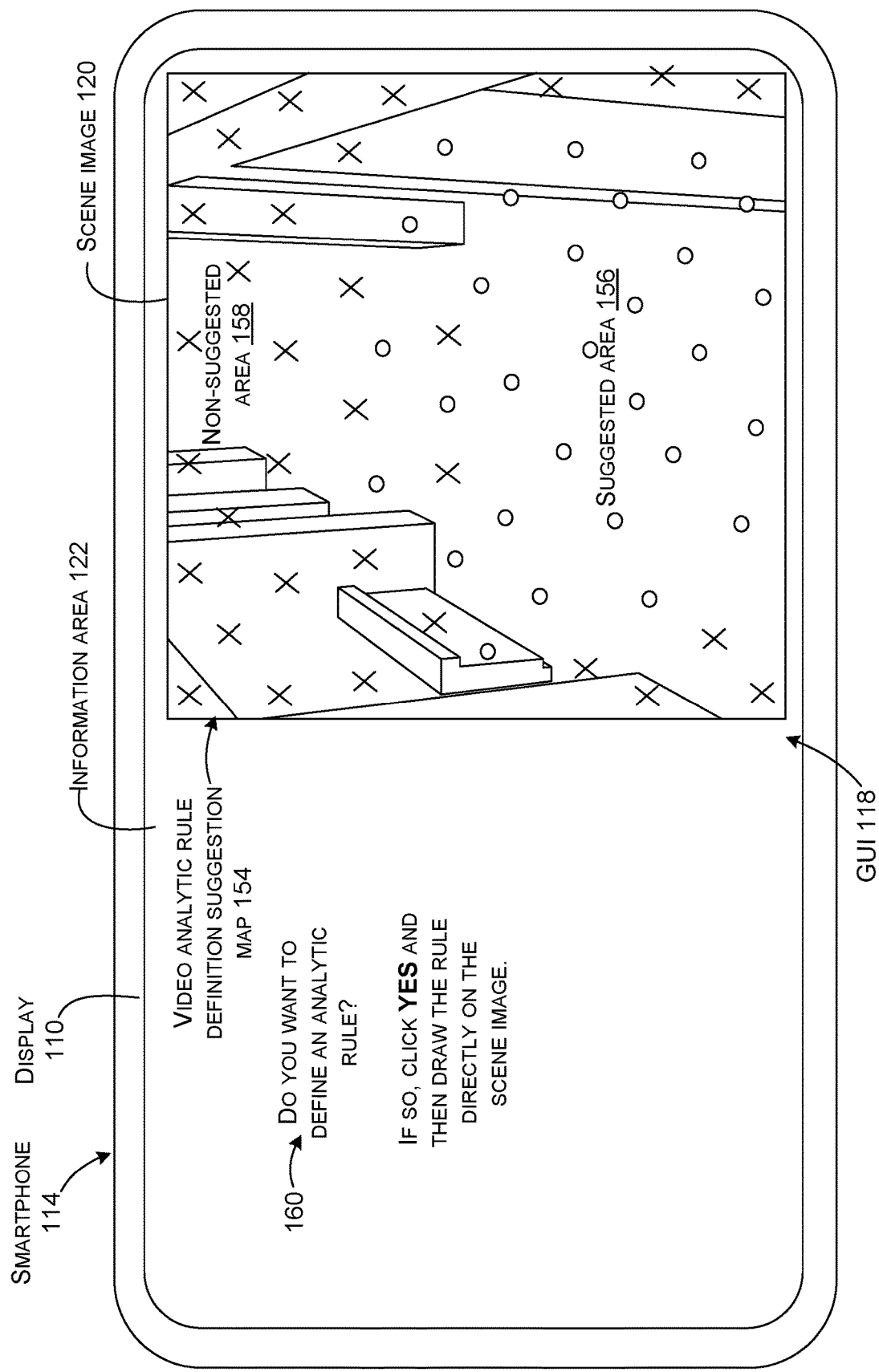

FIG. 1L shows a GUI 118 that allows the user the option of defining analytic rules. In this case, as indicated at 160, the user can select to define an analytic rule directly on the scene image. The user can select to have any of the information from FIGS. 1I-1K on the display when they define the analytics rule. In this case, assume that the user wants to draw the rule over the video analytic rule definition suggestion map 154.

Figure 1M:
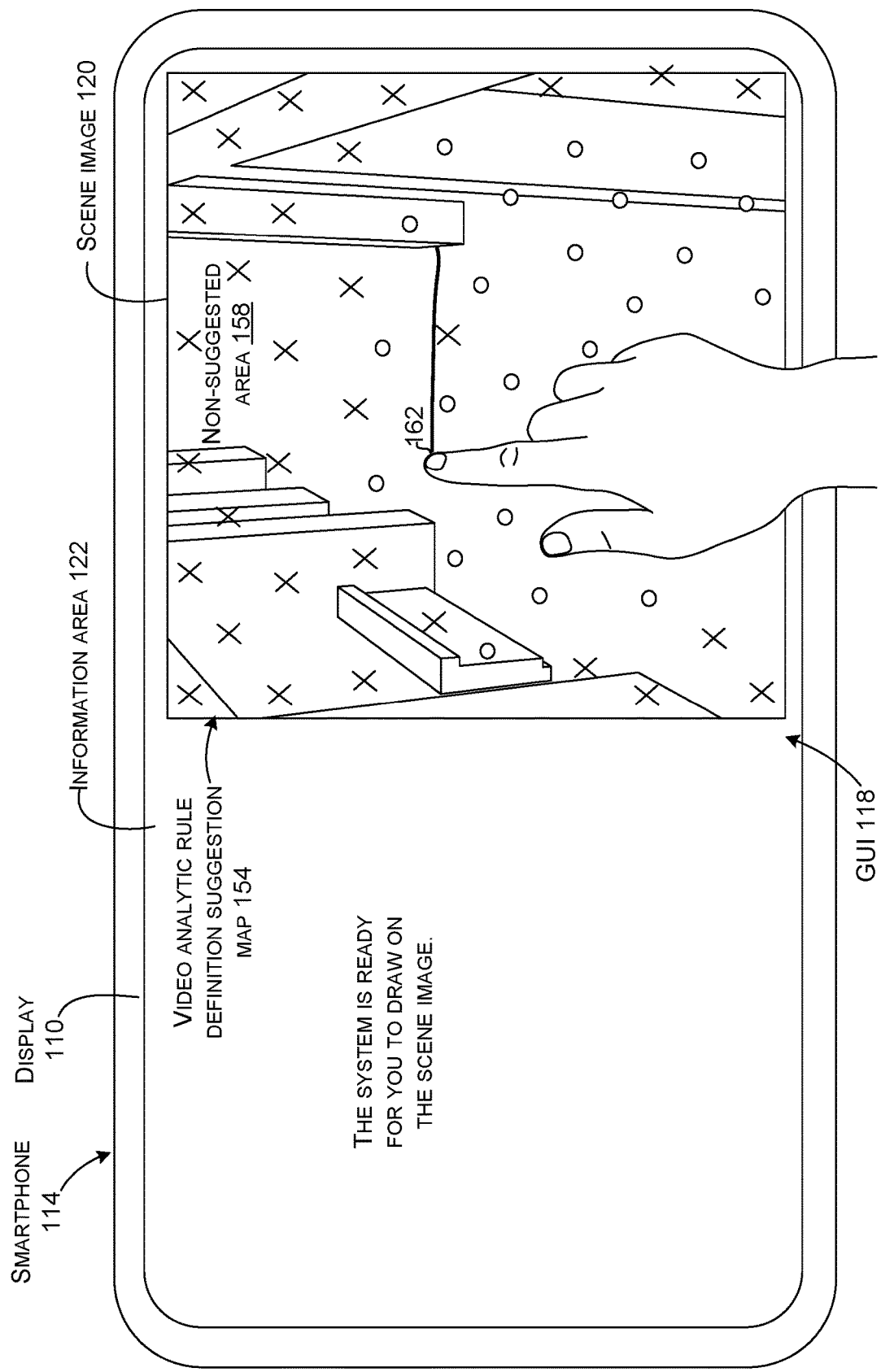

FIG. 1M shows the user drawing a line across the threshold at 162. For instance, the user may be interested in knowing how many people walk across the threshold toward the far end of the walkway. The user can define the rule with information from the system about the effectiveness of analytics in the region where the user wants to add the rule (e.g., draws the line).

FIG. 1N shows the user drawing a series of lines on the walkway at 164 to form a geometric shape, such as a polygon (e.g., in this case a rectangle). For instance, the user may be interested in knowing the total number of people who walk through the walkway in any direction. The user can make an informed decision based upon the region of interest to him/her in light of the information from the system regarding where high-quality analysis is obtainable in the scene. Thus, the user may adjust the region of interest to get better analytics performance. Either way, the user can make a more informed decision than was possible with existing technologies. For instance, the user may decide based upon the system information that the system cannot provide high performance in the region the user is interested in. As such, the user may reposition the camera and start the process again until the desired results are achieved.

Regardless, the process can remain a one-time event where the user gets vital information about what the system can actually achieve given the camera placement when defining analytics rules. The user can have confidence upon defining the analytics rules of what the system will produce. Unlike existing scenarios, there will not be any surprises when the user gets back to the control room that the system cannot accurately perform the defined rules in the selected regions. From one perspective, the present concepts allow the user to make decisions about analytics based not just on what the user wants, but also on what the system can actually do.

In the description above relating to FIGS. 1I-1K example informational maps are illustrated that can provide the user with information for defining rules relative to the scene images from the camera. The three example maps can be viewed as transparent heat maps superimposed over the scene image. The three illustrated example maps include an occlusion map, a human full body visible map, and a suggested rule definition map. Other maps that provide information to help the user make a more informed decision regarding rules to apply to analytics of the scene images are contemplated.

Traditionally, the user had little more than a gut feeling when installing the camera to achieve a desired purpose. This often wasted time and caused frustration as the user had to return to the camera multiple times to try to make adjustments that would improve performance. Thus, a technical problem with these installations was the lack of objective information available to the user about what the camera was actually capturing in the images and what could be obtained from analyzing the images from the camera.

The present concepts provide a technical solution where the camera system can self-calibrate and then show what the camera images of the scene are capturing and suggestions to improve the camera pose if needed. Further, the present concepts provide technical information to the user about the scene images from the camera and the quality of analytic results obtainable from the scene images both generally and region by region within the images. Thus, the user can make an informed decision based upon objective visual evidence when applying rules to the analysis of the scene images. This objective visual information further eliminates any possible disparity between what the user wants from analysis of the camera images and what the system can actually provide by analyzing the images. In the present implementations, objective visual evidence of system capabilities can be provided to the user as the user defines the rules that he/she wants.

Further, the technical solution can be implemented in real-time at the installation site so the user does not have to repeatedly return to try to get the camera set up properly. In the illustrated example, the installing user is able to see the camera view and manage the camera deployment on his/her smart device. The installing user doesn't need to leave the scene to run the system to get an analytics score. Instead, the installing user can send the evaluation command and get feedback scores on their smart device. All these operations can be conducted at the installation site, even on the ladder.

Figure 2:
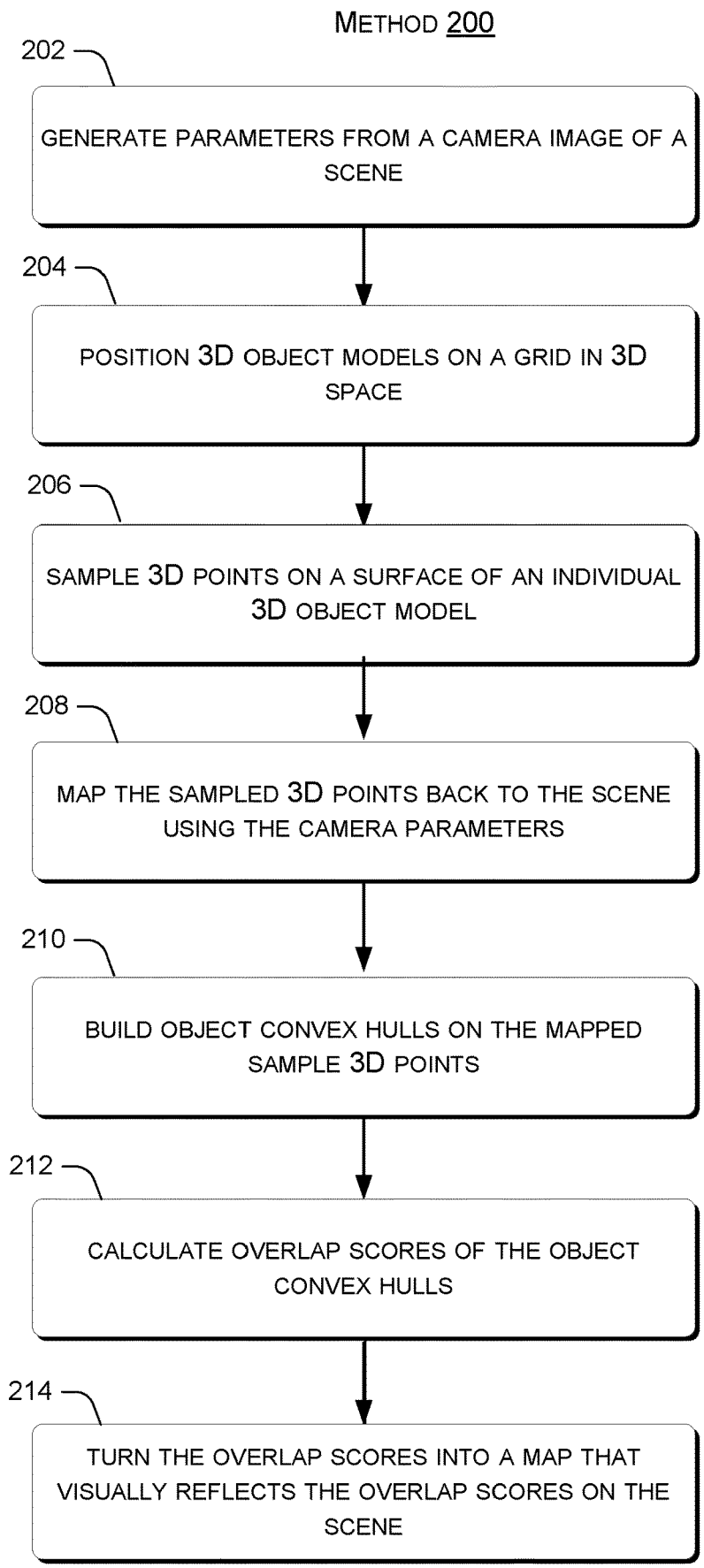
FIGS. 2-4 show example flowcharts for accomplishing camera guidance concepts in accordance with some implementations.

FIG. 2 shows an example camera management method or technique 200 for scoring a 2D camera installation. This example camera management method can support the scenarios described above relative to FIGS. 1A-1N. Similar techniques can be applied to other camera types.

Block 202 can generate parameters from a camera image of a scene. In some cases, the generating can be accomplished by running an auto-calibration algorithm to generate camera intrinsic and extrinsic parameters. Camera intrinsic parameters can include focus length and lens distortion parameters, among others. Camera extrinsic parameters can include camera height, camera tilt-up angle, and camera roll and pan angle, among others. An example auto-calibration method is described directly following the description relating to FIG. 2.

Block 204 can position 3D object models on a grid in 3D space. In some implementations, the positioning can entail building virtual 3D object models in 3D space. An object type can be selected, such as human, animal, vehicle, etc. Models of the selected object type, such as human models can be positioned on a grid in the 3D space. For instance, for humans, a 3 ft by 3 ft grid (distance adjustable) can be positioned in the space.

Block 206 can sample 3D points on a surface of an individual 3D object model. In some examples, 3D points on the surface of 3D human model can be sampled.

Block 208 can map the sampled 3D points back to the scene using the camera parameters. For instance, these sampled points can be mapped back to the 2D camera view using the camera intrinsic and extrinsic parameters.

Block 210 can build object convex hulls on the mapped sample 3D points.

Block 212 can calculate overlap scores of the object convex hulls. For example, in the case of human objects, if a pixel was covered by 1 human sample, its score is 1, two human samples, its score is 2 etc.

Block 214 can turn the overlap scores into a map that visually reflects the overlap scores on the scene. For instance, the map can be various types of heatmaps. Examples are illustrated above relative to FIGS. 1I-1K. The heatmaps can use visual indicators, such as two or more colors to convey information about regions of the scene. For example, green can reflect low overlap score and red can reflect a higher overlap score. Thus, information can be conveyed to the user by fading from dense green to sparse green to sparse red to dense red.

One example for calculating overlap scores can entail calculating the overlap ratio. The overlap ratio can equal (Summation of the overlap score)/(the total number of image pixels). If the overlap ratio is greater than 1, it can be set to 1. Then the whole-body visible area can be calculated. If the projected object convex hull (e.g., human convex hull) is all within the image, it is treated as 'whole body visible.' The whole-body visible area can be defined by putting projected human convex hulls touching the image boundary but with the whole body visible. A line can be used to connect all of the foot locations of these human convex hulls. The polygon formed by these lines can be treated as the whole-body visible area. See for example FIG. 1I.

The whole-body visible ratio can be calculated as (the whole-body visible area/whole image area). The final camera placement score (0-100) can now be calculated as final camera placement score equaling ((1−the overlap ratio)+the whole-body visible ratio)/2*100. An example camera placement score is illustrated and discussed above relative to FIG. 1H.

This discussion relates to an example method implementation for automatically calibrating a camera. In some versions, this calibration can be performed relative to a flat earth camera model. This model operates on the assumption that the ground on which the objects are resting is flat ground as opposed to an uneven or curved ground, which can simplify the calculations. Camera calibration can be triggered when the camera is turned on, when the pose is changed, and/or when requested by the user, among others.

Initially, the method can analyze a camera image of the scene to identify an object of a particular type. This analyzing process may include identifying a first set of key points of the object. In some cases, the image can be searched to identify a particular type of object. For example, the object type may be humans, vehicles, signs, or other objects. The object type can be searched based upon user input (e.g., the user specifies the type of object they are interested in, such as via a GUI). Alternatively, an object type can be searched because these objects are associated with a known set of average characteristics.

In some cases, the average characteristics can be dynamically determined. For instance, humans in Asia are on average shorter that humans in the United States. Consequently, these implementations are able to adjust or even dynamically determine the average characteristics based on specific attributes in a particular locale. Of course, other attributes or characteristics may be used as well. In some cases, the average characteristics can be adjusted over time.

In some cases, the particular type of the object is a human or a vehicle. Furthermore, the method may include an act of determining a so-called "sub-type" of the human or the vehicle. For instance, the sub-type of the human includes one or more of a gender of the human, a locality of the human, a race of the human, or perhaps a human adult or child. The sub-type of the vehicle may include a manufacturer, model, a car, truck, van, SUV, sedan, coupe, or year of the vehicle. The second set of key points can then be generated based on average characteristics that are determined for the sub-type of the human or the vehicle.

By way of example, the average characteristics for the sub-type of the human are one or more of an average height, an average neck length, and/or an average shoulder width based on the gender of the human as detected in the image or the locality of the human as determined by a location associated with the image (e.g., perhaps determined by GPS coordinates or recognizable geographic features captured in the image) or the race of the human as detected in the image. The average characteristics for the sub-type of the vehicle can include a length, width, weight, and so forth of a particular model of vehicle.

The method can generate, in three-dimensional (3D) space, a virtual object (e.g., 3D virtual object) of the same particular type as the object. Notably, the virtual object is associated with its own set of key points.

The method can include fitting a reprojected version of the second set of key points to the first set of key points in two-dimensional (2D) space. In some cases, this fitting may be modeled using a flat earth camera model. Furthermore, this fitting can be performed by repeatedly performing a number of operations one or more times, such as (but not necessarily) until a subsequently computed fitting error satisfies a fitting threshold or, additionally or alternatively, until a smallest fitting error is identified.

For instance, a 3D alignment can be generated of the second set of key points. This 3D alignment can be generated in an attempt to fit, in the 2D space (e.g., potentially modeled using the flat earth camera model), the second set of key points with the first set of key points (e.g., after or subsequent to the second set of key points being reprojected into the 2D space). In this regard, the 3D alignment is an estimated alignment that is designed in an effort to have a minimal fitting error.

While the second set of key points are in the 3D alignment, the second set of key points can be reprojected into the 2D space. In response to comparing the reprojected second set of key points to the first set of key points in the 2D space, the method can include determining whether a fitting error between the reprojected second set of key points and the first set of key points satisfies the fitting threshold. If the fitting threshold is satisfied, then the method can select a specific 3D alignment of the second set of key points. On the other hand, if the fitting threshold is not satisfied, then the above steps can be repeated until the fitting error does satisfy the fitting threshold. After repeating the operations the selected number of times, the method can identify the fitting error that is the smallest as compared to the other fitting errors that were computed in each iteration.

As mentioned above, if the fitting error is satisfied, the method can select a specific 3D alignment of the second set of key points. Because the processes may be performed multiple times, the selection process can include searching from among these multiple generated camera parameters (i.e. the alignment data) in an effort to select the set of parameters that have the least or smallest resulting fitting error and/or that satisfy the threshold requirement. In some cases, the selected parameter can be required to be both the smallest fitting error (as compared to the other computed fitting errors) and to satisfy the threshold requirement. In some examples, the selected parameter may simply be the one with the smallest fitting error as compared to the other fitting errors without necessarily satisfying the threshold requirement. In this regard, the method can search the camera parameters space (both internal and external) for the parameters having the least fitting error by performing the exhaustive parameter search or by using machine learning.

Notably, the above selected specific 3D alignment can be selected because it is structured to cause the reprojected second set of key points, or rather the computed fitting error corresponding to the comparison between the reprojected second set of key points and the first set of key points, to satisfy the fitting threshold when the reprojected second set of key points are compared to the first set of key points in the 2D space. Additionally, or alternatively, the selected set is the one that has the smallest or least fitting error. These method acts can constitute a "fitting" procedure used to accurately map an image into 3D space. Furthermore, the modified virtual object can now accurately fit the object, or rather, the two sets of key points align with one another such that the fitting errors satisfy the fitting threshold. The modified virtual object, or rather the modified reprojected key point(s) can correspond to the reprojected second set of key points. Similarly, the specific 3D alignment, which forms the basis for the modified reprojected key point(s), can correspond to the specific 3D alignment.

Once the two sets of key points fit one another (as determined by the comparison of the fitting errors against the fitting threshold), the method can identify reprojection parameters associated with the specific 3D alignment of the second set of key points. These parameters are the ones whose fitting error satisfies the threshold and/or whose fitting error is the smallest as compared to all the other computed fitting errors. Then, there can be an operation of using those reprojection parameters to calibrate the camera that generated the image. Specifically, the reprojection parameters can be used to calibrate one or more of the following for the camera: (i) a height of the camera, (ii) a tilt angle of the camera, (iii) a focal length of the camera, or (iv) a distortion for the camera. By performing these operations, the method can calibrate a camera without prior information regarding a focal length of the camera, a distortion matrix of the camera, a tilt angle of the camera, or even a height of the camera.

Figure 3:
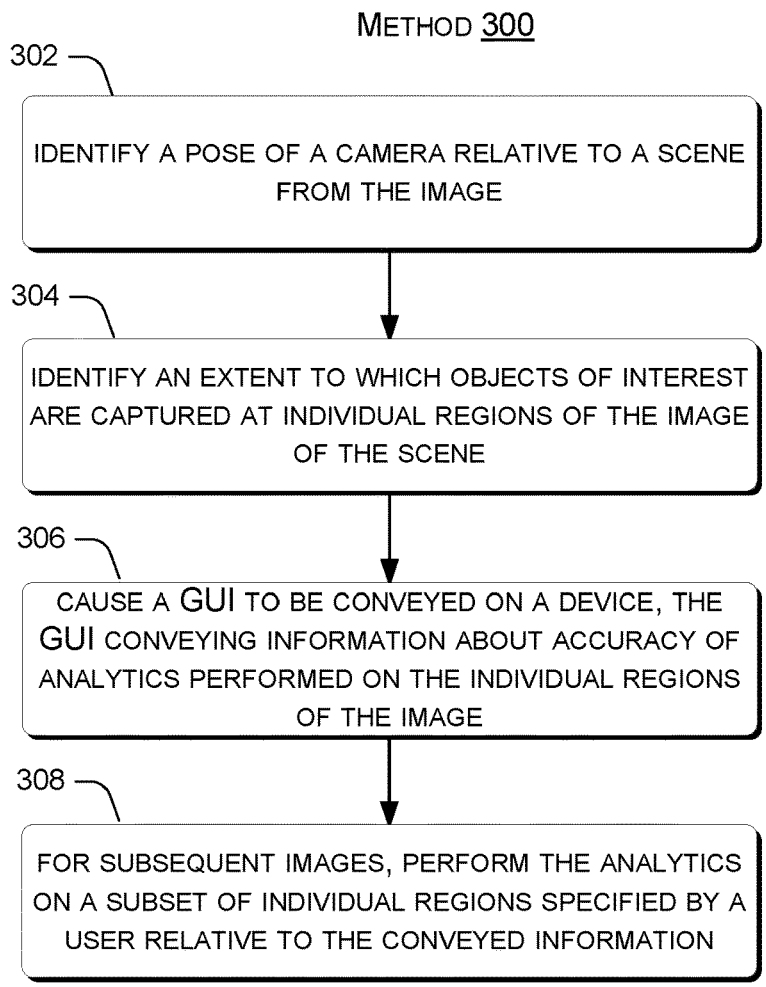

FIG. 3 shows an example camera management method or technique 300 for scoring a camera installation. This example camera management method can support the scenarios described above relative to FIGS. 1A-1N. This method can be employed with various camera types, such as 2D cameras, 3D cameras, and/or hybrid 2D-3D configurations, among others.

Block 302 can identify a pose of a camera relative to a scene from the image. An example is described above relative to FIG. 1H and in the discussion above.

Block 304 can identify an extent to which objects of interest are captured at individual regions of the image of the scene. Various examples are described above.

Block 306 can cause a graphical user interface to be conveyed on a device. The graphical user interface can convey information about accuracy of analytics performed on the individual regions of the image. In some cases, this information can be conveyed as maps superimposed on the image. Examples are described above relative to FIGS. 1I-1K.

Block 308 can, for subsequent images, perform the analytics on a subset of individual regions specified by a user relative to the conveyed information. For instance, the user may define a rule by drawing on the GUI that includes the maps.

Thus, the user can be provided with objective information about the capabilities of the system at analyzing individual object types at individual regions of the images. The user can use this objective information, along with their own information, such as the desire to know how many people walk through a particular doorway. If the objective information indicates that the system analytics can accurately detect humans in the regions including the doorway, the user can define a rule at the doorway, such as by drawing directly on a touch display presenting the objective information. The analytics can be performed on subsequent images consistent with the user defined rules to provide the information desired by the user (e.g., how many people pass through the doorway).

Figure 4:
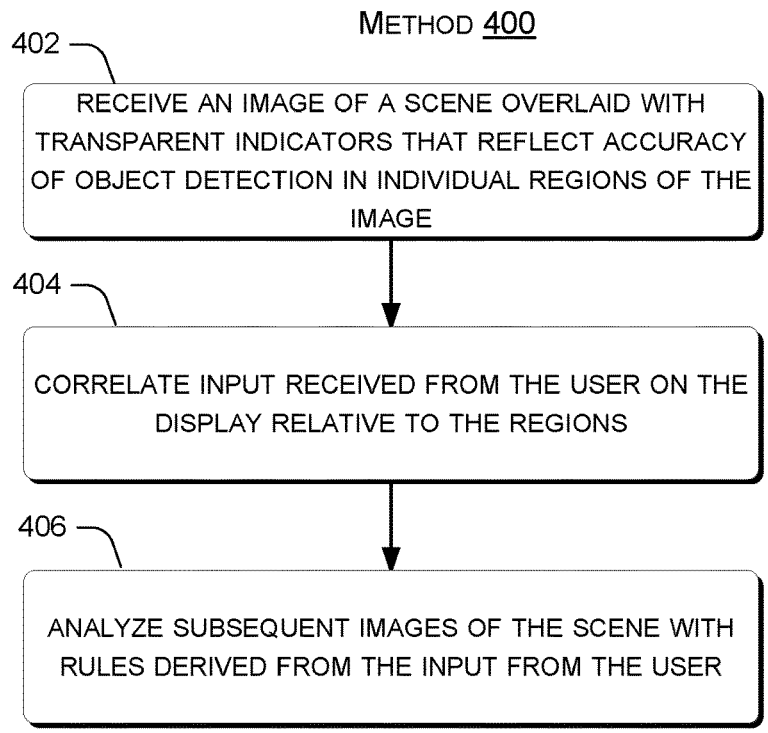

FIG. 4 shows an example camera management method or technique 400 for scoring a camera installation. This example camera management method can support the scenarios described above relative to FIGS. 1A-1N. This method can be employed with various camera types, such as 2D cameras, 3D cameras, and/or hybrid 2D-3D configurations, visible light cameras and/or non-visible light cameras, among others.

Block 402 can receive an image of a scene overlaid with transparent indicators that reflect accuracy of object detection in individual regions of the image.

Block 404 can correlate input received from the user on the display relative to the regions.

Block 406 can analyze subsequent images of the scene with rules derived from the input from the user.

The methods described relative to FIGS. 2-4 provide camera management and guidance that can facilitate a simplified camera installation that provides desired results. During the installation process, the user can be shown what the camera is capturing and whether analytics performed on images from the camera are going to produce the desired results for the regions of the images that are of interest to the user.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Figure 5:
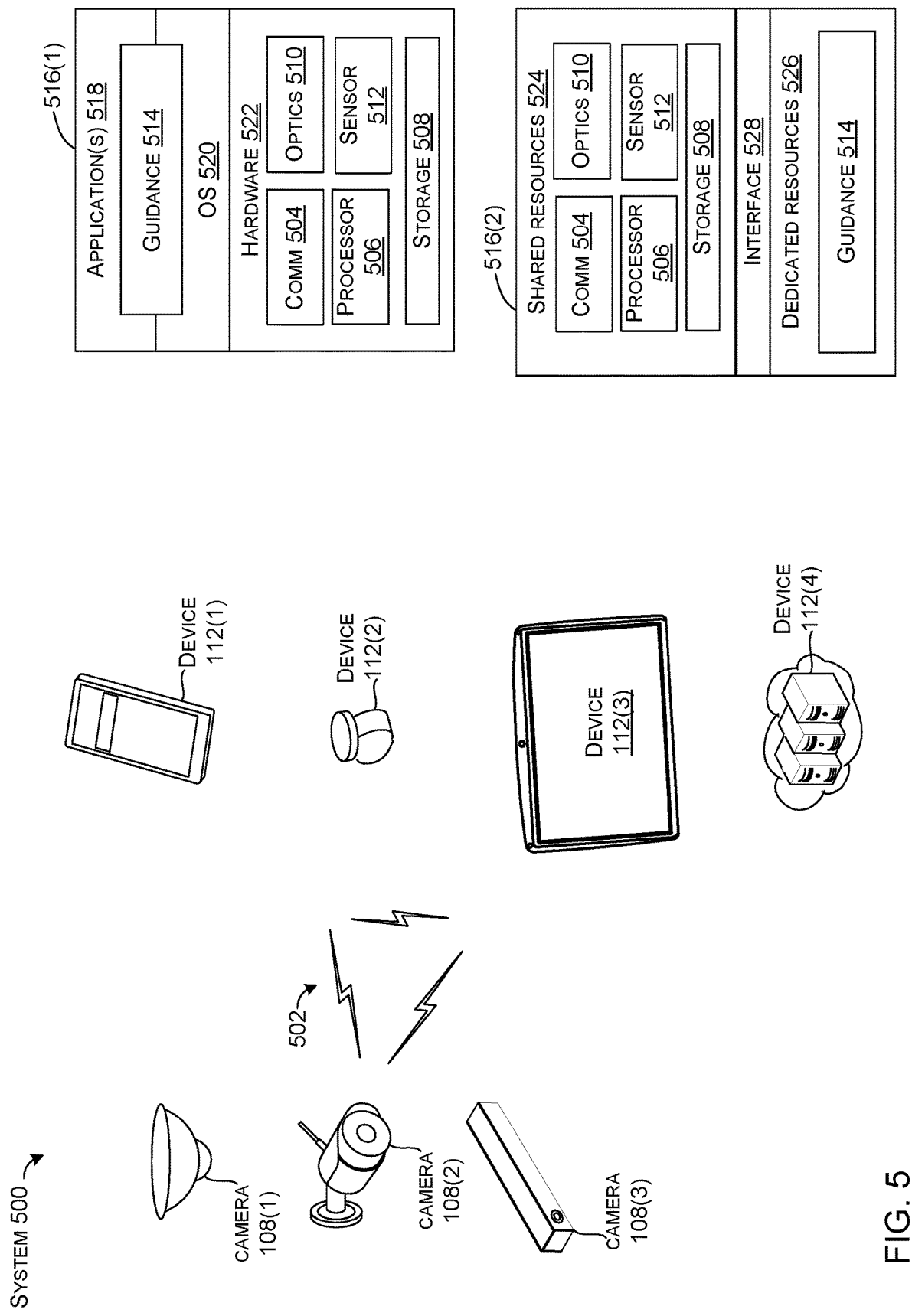
FIG. 5 shows an example system for accomplishing camera guidance concepts in accordance with some implementations.

FIG. 5 shows an example system 500 that can provide interactive visual guidance and management for camera placement and user specified rule definitions. For purposes of explanation, system 500 can include various cameras 108 and (computing) devices 112. The illustrated examples include a ceiling mounted camera 108(1), a wall mounted camera 108(2), and a camera bar 108(3) that can be used in various scenarios, such as gaming, entertainment, and, virtual/augmented realty scenarios, among others.

Some devices 112 can have displays 110, such as touch sensitive displays. Some cameras 108 may also be devices 112 and/or may have displays 110. Device 112(1) is manifest as a smart phone, device 112(2) is manifest as a smart watch, device 112(3) is manifest as a tablet-type device, and device 112(4) is manifest as a server type device. Any of the cameras 108 and/or devices 112 can be free-standing and/or can communicate with other devices, either through wired or wireless means as represented by lightning bolts 502.

The cameras 108 and/or devices 112 can include a communication component 504, a processor 506, storage 508, optics 510, sensor 512, and/or a guidance component 514.

The guidance component 514 can analyze camera images to identify the pose of the camera relative to a scene in the camera images. The guidance component can identify an extent to which objects are captured at individual regions of the image. The guidance component can cause information about the regions and the accuracy of analytics performed on the regions to be conveyed in a graphical manner. The guidance component can receive user input to define analytic rules to be performed on specific regions of subsequent images of the scene. Examples of how these aspects can be achieved are described above.

FIG. 5 shows two device configurations 516 that can be employed by cameras 108 and/or devices 112. Individual cameras 108 and/or devices 112 can employ either of configurations 516(1) or 516(2), or an alternate configuration. (Due to space constraints on the drawing page, one instance of each configuration is illustrated). Briefly, device configuration 516(1) represents an operating system (OS) centric configuration. Device configuration 516(2) represents a system on a chip (SOC) configuration. Device configuration 516(1) is organized into one or more applications 518, operating system 520, and hardware 522. Device configuration 516(2) is organized into shared resources 524, dedicated resources 526, and an interface 528 therebetween.

In configuration 516(1), the guidance component 514 can be manifest as part of the processor 506. Alternatively, the guidance component 514 can be manifest as an application that operates in conjunction with the processor 506. In configuration 516(2), the guidance component 514 can be manifest as part of the processor 506 or a dedicated resource that operates cooperatively with the processor 506.

In some configurations, each of cameras 108 and/or devices 112 can have an instance of the guidance component 514. However, the functionalities that can be performed by guidance components 514 may be the same or they may be different from one another. For instance, in some cases, each device's guidance component 514 can be robust and provide all of the functionality described above and below (e.g., a device-centric implementation).

In other cases, some devices can employ a less robust instance of the guidance component 514 that relies on some functionality to be performed by another device. For instance, camera 108(1) may communicate images to server device 112(4). The server device 112(4) may have a large amount of processing resources. The server device 112(4) could then send image related content to smart phone device 112(1) for display to the user at the installation site. The smart phone device 112(1) can receive user input relative to the image related content. For instance, the user could draw on the touch sensitive display over the image related content. The smart phone device 112(1) could send the user input back to the server device 112(4) where image related analytics can be performed.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 516(2) can be thought of as a system on a chip (SOC) type design. In such a case, functionality provided by the device can be integrated on a single SOC or multiple coupled SOCs. One or more processors 506 can be configured to coordinate with shared resources 524, such as memory/storage 508, etc., and/or one or more dedicated resources 526, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a system comprising a communication component configured to receive an image of a scene captured by a camera. A processor can be configured to identify a pose of the camera relative to the scene from the image, identify an extent to which objects of interest are captured at individual regions of the image of the scene, and cause a graphical user interface to be conveyed on a device, the graphical user interface conveying information about accuracy of analytics performed on the individual regions of the image, and for subsequent images, perform the analytics on a subset of individual regions specified by a user relative to the conveyed information.

Another example can include any of the above and/or below examples where the system includes the camera that captures the image or wherein the system receives the image from the camera.

Another example can include any of the above and/or below examples where the pose comprises a distance of the camera from the scene, a height of the camera above the scene, and an orientation of the camera toward the scene.

Another example can include any of the above and/or below examples where the processor is further configured to suggest a change in the distance, the height, and/or the orientation to increase the extent of the object of interest that subsequent images will capture at the individual regions of the scene.

Another example can include any of the above and/or below examples where the identifying an extent to which objects of interest are captured at individual regions of the image of the scene comprises identifying the individual regions of the scene where the image captures entire objects of interest.

Another example can include any of the above and/or below examples where the processor is further configured to cause the device to receive user input defining analytics rules for subsequent images from the camera.

Another example can include any of the above and/or below examples where the processor is further configured to cause the device to receive user touch input on the graphical user interface defining analytics rules for the subsequent images from the camera.

Another example can include any of the above and/or below examples where the processor is further configured to cause the device to receive the user input directly on the image.

Another example can include any of the above and/or below examples where the user input comprises lines on the image or geometric shapes on the image.

Another example can include any of the above and/or below examples where the communication component and the processor are on the device.

Another example can include any of the above and/or below examples where the device also includes the camera.

Another example can include any of the above and/or below examples where the communication component and the processor are on another device that is separate from the device and the camera.

Another example includes a method comprising generating camera parameters from a camera image of a scene, positioning 3D object models on a grid in 3D space, sampling 3D points on a surface of an individual 3D object model, mapping the sampled 3D points back to the scene using the camera parameters, building object convex hulls on the mapped sample 3D points, calculating overlap scores of the object convex hulls, and turning the overlap scores into a map that visually reflects the overlap scores on the scene.

Another example can include any of the above and/or below examples where the generating comprises generating intrinsic and extrinsic camera parameters.

Another example can include any of the above and/or below examples where the positioning 3D object models comprises positioning 3D human models, 3D vehicle models, or 3D animal models.

Another example can include any of the above and/or below examples where the calculating overlap scores comprises calculating an overlap ratio that equals a summation of the overlap scores divided by a total number of image pixels in the camera image of the scene.

Another example can include any of the above and/or below examples where the method further comprises causing the map to be superimposed on the camera image of the scene and causing the camera image with the superimposed map to be presented on a device.

Another example can include any of the above and/or below examples where the method further comprises configuring the device to receive rule defining input from a user on the camera image with the superimposed map.

Another example can include any of the above and/or below examples where the turning the overlap scores into a map comprises turning the overlap scores into a heatmap.

Another example can include any of the above and/or below examples where the method further comprises causing the heatmap to be transparently superimposed over the camera image.

Another example can include any of the above and/or below examples where the generating camera parameters from a camera image of a scene comprises generating the camera parameters from a single camera image or from a stream of video images.

Another example includes a device comprising a display and a processor configured to receive an image of a scene overlaid with transparent indicators that reflect accuracy of object detection in individual regions of the image, correlate input received from a user on the display relative to the regions, and analyze subsequent images of the scene with rules derived from the input from the user.

Another example can include any of the above and/or below examples where the device further includes a camera that captures the image or wherein the device includes a communication component configured to receive the image captured by the camera.

Conclusion

Although techniques, methods, devices, systems, etc., pertaining to camera guidance are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A system, comprising:
a communication component configured to receive an image of a scene captured by a camera; and,
a processor configured to:
 receive an input that specifies an intended use of the camera, the intended use including a type of object and a type of analysis;
 identify a pose of the camera relative to the scene from the image;
 calculate a score for the pose based at least on an extent to which the type of object is captured at individual regions of the image and accuracy of the type of analysis performed on the type of object in the individual regions of the image; and cause a graphical user interface to display the score.

2. The system of claim 1, wherein the system includes the camera that captures the image, or wherein the system receives the image from the camera.

3. The system of claim 1, wherein the pose comprises a distance of the camera from the scene, a height of the camera above the scene, and an orientation of the camera toward the scene.

4. The system of claim 3, wherein the processor is further configured to suggest a change to the pose of the camera to increase the extent of the type of object that subsequent images will capture at the individual regions of the scene, the change to the pose of the camera including a change to at least one of the distance, the height, or the orientation.

5. The system of claim 1, wherein the processor is further configured to receive a user input on the graphical user interface defining analytics rules for subsequent images from the camera.

6. The system of claim 5, wherein the processor is further configured to receive the user input directly on the image.

7. The system of claim 6, wherein the user input comprises lines on the image or geometric shapes on the image.

8. The system of claim 1, wherein the processor is configured to cause the score to be displayed in real-time with the image captured by the camera.

9. The system of claim 1, wherein the score is a camera installation quality score.

10. The system of claim 1, wherein the type of object includes people, vehicles, or animals.

11. The system of claim 1, wherein the type of analysis includes detecting objects, identifying objects, counting objects, or determining a duration objects are in an area.

12. A method, comprising:
generating camera parameters from a camera image of a scene;
positioning 3D object models on a grid in 3D space;
sampling 3D points on a surface of an individual 3D object model;
mapping the sampled 3D points back to the scene using the camera parameters;
building object convex hulls on the mapped sample 3D points;
calculating overlap scores of the object convex hulls for a plurality of pixels based at least on a number of object samples that cover a particular pixel of the plurality of pixels;
generate an occlusion heatmap that visually reflects the overlap scores for regions in the scene; and
causing a graphical user interface to display the occlusion heatmap that conveys the overlap scores.

13. The method of claim 12, wherein the calculating overlap scores comprises calculating an overlap ratio that equals a summation of the overlap scores divided by a total number of image pixels in the camera image of the scene.

14. The method of claim 12, further comprising causing the occlusion heatmap to be superimposed on the camera image of the scene and causing the camera image with the superimposed occlusion heatmap to be presented on the graphical user interface of a device.

15. The method of claim 14, further comprising receiving a rule-defining input from a user on the camera image with the superimposed occlusion heatmap.

16. The method of claim 14, further comprising causing the occlusion heatmap to be transparently superimposed over the camera image.

17. The method of claim 12, wherein the generating camera parameters from a camera image of a scene comprises generating the camera parameters from a single camera image or from a stream of video images.

18. A device, comprising:
a display; and,
a processor configured to:
receive an image of a scene overlaid with one or more transparent maps that reflect accuracy of object detection and performance of analysis in individual regions of the image;
display the image overlaid with the one or more transparent maps on the display to a user;
receive an input from the user on a particular region of the display, the input defining an analytics rule within the particular region; and,
analyze subsequent images of the scene using the analytics rule derived from the input from the user.

19. The device of claim 18, further comprising:
a camera that captures the image; or
a communication component configured to receive the image captured by the camera.

20. The device of claim 18, wherein the input includes a threshold line, and the analytics rule counts a number of people who cross the threshold line.

21. The device of claim 18, wherein the input includes a polygon, and the analytics rule counts a number of people who move through the polygon.

22. The device of claim 18, wherein the one or more transparent maps include an occlusion map that indicates a likelihood of occlusion for the regions, a full body visible map that shows in which of the regions full bodies are visible, or a rule definition suggestion map that suggests in which of the regions the analytics rule should be defined.

* * * * *